Jan. 6, 1970  AKIRA YAMAMORI  3,487,679
ELECTRICAL OPHTHALMOTONOMETER
Filed Sept. 21, 1965  2 Sheets-Sheet 1

INVENTOR.
AKIRA YAMAMORI
BY Oldham & Oldham
attys

INVENTOR.
AKIRA YAMAMORI
BY Oldham and Oldham
attys

United States Patent Office

3,487,679
Patented Jan. 6, 1970

3,487,679
ELECTRICAL OPHTHALMOTONOMETER
Akira Yamamori, 8, 4-chome, Yotsuya, Shinjuku-ku, Tokyo, Japan
Filed Sept. 21, 1965, Ser. No. 488,971
Int. Cl. A61b 9/00
U.S. Cl. 73—80                                    1 Claim

ABSTRACT OF THE DISCLOSURE

An ophthalmologic tonometer comprising a pressure-receiving unit designed to be vertically positioned in contact with the outer surface of the cornea of the eye under examination. A foot plate with a central aperture has a concave bottom face and a vertical plunger rod loosely fitted at the bottom in the aperture and vertically movable relative thereto within certain limits. Both the plunger rod and the bottom face are concave to a radius of curvature slightly larger than that of the surface of the cornea of the normal human eye. Electrical strain gauge means are utilized for measuring the force of pressure applied by the cornea to the plunger rod when the bottom end face of the foot plate is lightly pressed against the surface of the cornea. A vertically extending rod from the top of the unit provides a stabilizing means to insure smooth and accurate vertical movement to the unit for its operational use.

---

The present invention is concerned with ophthalmotonometers and has for its object to provide an electrical ophthalmotonometer which is capable of electrically measuring the hydrostatic pressure within the eyeball while minimizing deformation thereof.

Measurement of the hydrostatic pressure within the eyeball, known as the intraocular pressure, is important in diagnosis of glaucoma and other eye disorders and previously known tonometers serving the purpose are broadly classified into two types, impression type and applanation type. The former type of ophthalmotonometer includes a concave foot plate to be placed on the cornea and a plunger arranged to descend through an aperture formed centrally of the foot plate to press against the cornea. With this type of tonometer, the plunger pressure applied to the cornea and the depression of the latter are measured to find the intraocular pressure on a conversion table. The table, however, is one prepared upon the basis of experimental data and is supposed to involve considerable errors due to variations among different individuals in stickiness and elasticity of the cornea. On the other hand, with the latter or applanation type of tonometer, which is designed to apply a planar pressure to the cornea, the intraocular pressure is obtained from the product of the applanation area, i.e. the area of that portion of cornea surface placed in contact with the planar member of the tonometer and the pressure force of the latter acting against the cornea. This type of tonometer is apparently advantageous in that it involves no error otherwise derivable from the stickiness of the cornea and that the introcular pressure being actually measured is substantially equal to that before application to the eye of the tonometer since the eyeball during measurement is subjected to only a very limited change in intraocular volume. Nevertheless, with this type of tonometer, errors due to the elasticity of the cornea cannot be eliminated.

In an attempt to overcome this difficulty, a modified form of applanation tonometer has previously been proposed which includes a foot plate and a plunger both having a planar bottom end. The plunger is fixed relative to the foot plate so as to extend downwardly five microns beyond the bottom end of the foot plate and an upward force of pressure applied to the plunger by the cornea when the tonometer has been properly applied thereto is measured. With such tonometer, though any error may be eliminated which is derivable from the elastic deformation of the cornea in the vicinity of its portion flattened by the plunger, an error is inevitably involved which is derivable from the elasticity of that portion of the cornea which is actually flattened by the plunger. It will be apparent that any error derivable from variation in the intraocular volume of the eyeball under examination or from the elasticity of the cornea can be completely eliminated if, independently from the conventional thought of measuring the intraocular pressure by impression or applanation, measurement of the intraocular pressure be made possible without necessitating any deformation of the eye under examination. Such, however, would be impossible unless a canule is used for insertion into the eyeball and the use of such canule is to be avoided as far as possible because it involves some clinical danger. Under these circumstancts, it is desirable to measure the intraocular pressure in a manner such as to minimize the deformation of the eyeball under examination. The present invention is intended to meet this demand.

Further objects and advantages of the present invention will become apparent from the following detailed description, reference being had to the accompanying drawings showing one preferred embodiment chosen by way of example of the electrical tonometer according to the invention and graphically illustrating the principles thereof. In the drawings.

Figure 6:
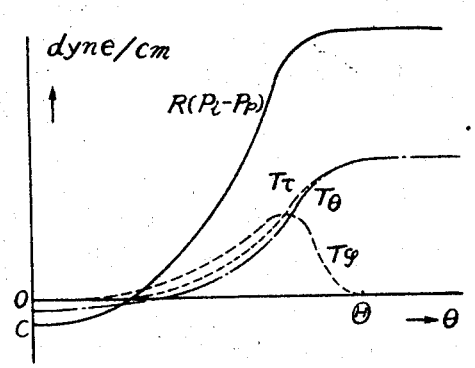
Figure 7:
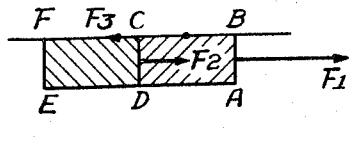
Figure 8:
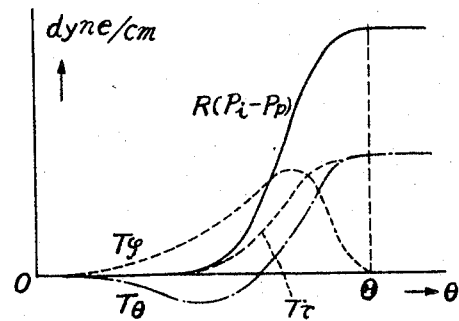

FIG. 6 graphically illustrates the distribution of tension to which the cornea is subjected;

FIG. 7 schematically illustrates two adjacent sections of the cornea when frictionally engaged by the concave face of the tonometer; and FIG. 8 graphically illustrates the distribution of tension to which the cornea is subjected when it is frictionally engaged as in FIG. 7.

Figure 1:
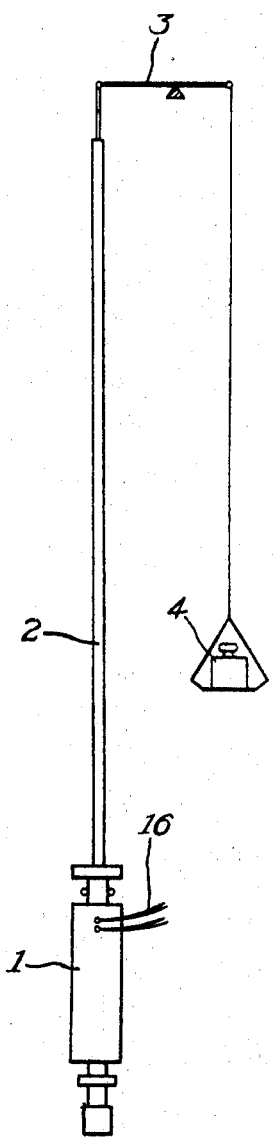
FIG. 1 illustrates the entire arrangement of the tonometer embodying the present invention.

Referring first to FIG. 1, a pressure-receiving unit 1 with a vertical rod 2 of substantial length fixed to the top thereof is balanced with a weight 4 by way of a lever 3.

Figure 2:
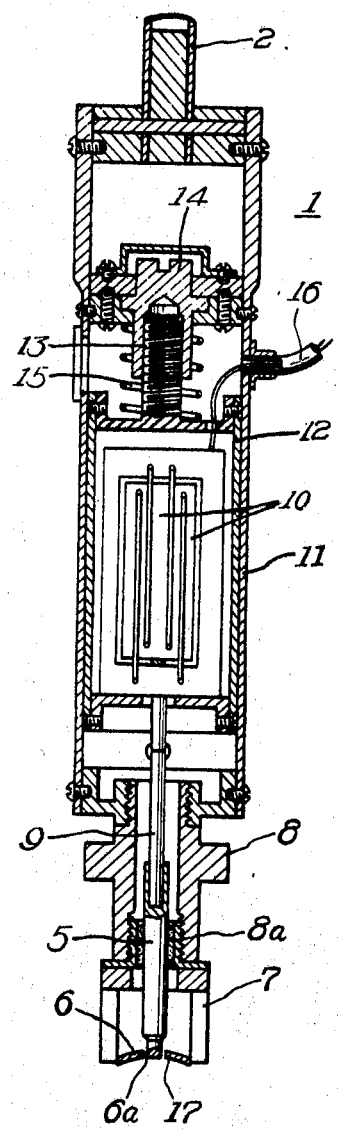
FIG. 2 is a vertical cross-sectional elevation of the pressure-receiving unit of the embodiment.

Referring next to FIG. 2, which illustrates the internal structure of the pressure-receiving unit 1, a plunger rod 5 made of transparent acrylic resin in a diameter of 2 millimeters extends vertically and has its bottom end positioned in an aperture formed centrally of a foot plate 6, which is also made of transparent acrylic resin and has a diameter of 10 millimeters and a thickness of one millimeter. The aperture in the foot plate has a diameter slightly larger than that of the bottom end of the rod 5. The rod 5 and the foot plate 6 both have a bottom surface concavely curved to a radius of curvature of 9.5 millimeters. The foot plate 6 is connected to the bottom of a metallic tubular holder 8 by a pair of posts 7. A tube 8a of silicone rubber is inserted in an annular space between the holder 8 and a portion of the rod 5 extending therethrough. The rod 5 is connected to a strain gauge 10 by way of a metal rod 9 connected to the top of plunger rod 5.

Figure 3:
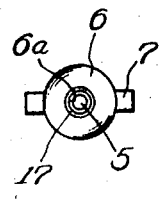
FIG. 3 is a bottom plan view of the bottom end face of the pressure-receiving unit placed in contact with the eye to be examined.

A tubular body 11 of the unit 1 is connected to the top of the holder 8. Fitted in the tubular body 11 is a casing 12 enclosing the strain gauge 10 and threadably connected with an internally threaded adjusting stud 14, which is in threadable engagement with an externally threaded post 13 formed on the top of the casing 12 axially thereof, as illustrated. The stud 14 is grooved at its top to receive an appropriate screw driver and serves, when turned, to vertically move the strain gauge casing 12 with the plunger rod 5 connected thereto. A compression spring 15 is arranged, as illustrated, to eliminate any play otherwise occurring between the adjusting stud 14 and the casing 12. The stud 14 is held against axial movement relative to the tubular body 11 of the unit by suitable means, for example, as shown in FIG. 2, and is fixed in an angular position adjusted normally to hold the bottom face of the rod 5, five microns below the bottom face of the foot plate 6, which is slightly recessed in a circular form of 3.8 mm. diameter, as indicated at 17 in FIG. 3.

The plunger load or the force of pressure acting to raise the plunger rod is transformed by the strain gauge 10 into a voltage, which corresponds to the unbalance caused between the electric resistances in the strain gauge and is conducted through conductor means 16 to a recorder not shown.

Figure 4:
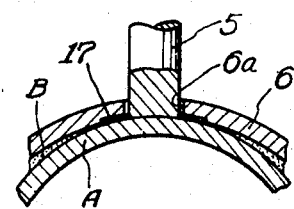
FIG. 4 is a fragmentary enlarged vertical cross section showing the manner in which the bottom end of the pressure-receiving unit is in contact with the cornea of the eye under examination.

For measurement of the intraocular pressure, the subject is laid on his back and the eye to be examined is anesthetized by dropping lotion therein. The tonometer, which is supported on an appropriate stand, not shown, is adjusted to place the pressure-receiving unit directly above the eye. Then, a drop of physiological solution of sodium chloride containing fluorescein is let fall onto the cornea and by grasping the tubular holder 8 by hand the operator slowly lowers the pressure-receiving unit until its bottom comes into contact with the cornea A, as shown in FIG. 4, to lightly press the latter. The operator now slowly translates the pressure-receiving unit while observing the region of contact through a binocular magnifier to ensure that the area including solution of fluorescein extends to completely surround the bottom end of the plunger rod but never extends beyond the recess 17. On this occasion, the layer of solution of fluorescein B on the cornea can be readily observed as it emits fluorescent rays when irradiated with an ultraviolet lamp.

In this manner, the intraocular pressure can be obtained from the graphical record of the plunger load as a quotient of the plunger load divided by the cross-sectional area of the plunger or more correctly by the area of a circle having a diameter corresponding to the average between the diameter of the central aperture in the foot plate and that of the plunger rod.

The principles of the present tonometer will next be explained in detail.

Figure 5:
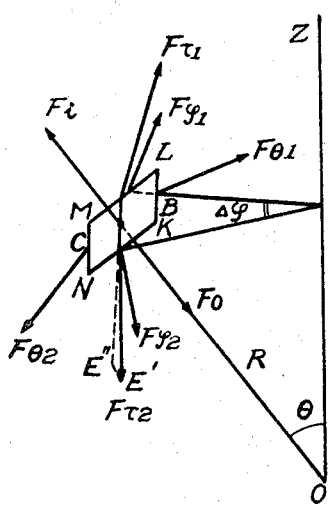
FIG. 5 is a vector diagram showing the forces acting on a point in the area of contact between the cornea and the concave bottom face of the tonometer.

Assumption is made that no frictional force occurs between the concave face of the tonometer and the cornea being examined and the origin or point of reference O is placed at the center of curvature of the spherical concave surface pressing the cornea, as illustrated in FIG. 5. The axis OZ extends in the direction of the force of pressure applied to the cornea by the concave face, which has a radius of curvature R. In this manner, a spherical coordinate system $(s, \theta, \phi)$ is constructed, the angle $\theta$ being measured from the axis OZ. Assume that $P_i$ denotes the pressure acting from inside at right angles to the surface of contact and expressed in dynes per square centimeter and $P_P$ the pressure of the concave face acting in the direction of $\theta=0$ and expressed also in dynes per square centimeter. Let $T\theta(\theta)$ denote the tension acting in the direction longitudinal of the cornea surface, $T\tau(\theta)$ that acting at right angles thereto and $T\phi(\theta)$ that acting in the direction of the parallel line on the surface, all expressed in terms of dynes per centimeter. Then, the balanced relation of the forces is expressed as follows:

$$\frac{dT\theta(\theta)}{d\theta} = T\phi(\theta) \cot \theta \quad (1)$$

Since $T\theta > 0$, $T\theta(\theta)$ is a monotone increasing function of $\theta$.

As $P_P$ expresses a component force of pressure acting between the cornea and the concave surface in parallel to the axis OZ per unit area of the plane at right angles to the axis OZ, the following formula is obtained from the balanced relation between forces acting in parallel to the axis OZ:

$$P_i = P_P + \frac{1}{R}(T\theta + T\tau + T\phi) \quad (2)$$

Also, employing a coefficient of proportion, $h$, the following approximate formula is obtained:

$$T\phi(\theta) = h\theta^2 \quad (3)$$

Let Ⓗ denote $\theta$ for that portion of the cornea which is sufficiently spaced from the area of contact with the concave face to be free from any effect of the latter. Then, obviously $$T(Ⓗ) = T\tau(Ⓗ) \quad (4)$$

and $$T\phi(Ⓗ) = 0 \quad (5)$$

The tensions $T\theta$, $T\tau$ and $T\phi$ can be illustrated modelwise as in FIG. 6 upon the basis of the Formulas 1, 2, 3, 4 and 5.

From the Formula 2 is given $$R(P_i - P_P) = T\theta + T\tau + T\phi \quad (6)$$

and $R(P_i - P_P)$ is shown in FIG. 6 in a solid line.

Also, the ordinate C of the point where the line $R(P_i - P_P)$ intersects the ordinate axis is expressed by $C = C(Ⓗ)$, which is obviously an acute simple monotone decreasing function of Ⓗ. Namely, as the area of contact increases, the plunger load $P_P$ per unit cross-sectional area of the plunger rod is increased rapidly. This means that, even with an assumption that no frictional force acts between the concave face and the surface of the cornea, the value of the Formula 6 around the area of contact decreases rapidly toward its center.

In practical cases, of course some frictional force acts between the contacting surfaces of the cornea and the concave face. In FIG. 7, ABCD represents a small portion of the cornea and BC its surface of contact with the concave face. Let, $F_1$ be the force acting on the side AB, and $F_3$, the frictional force acting in the surface BC. Then, the force $F_2$ acting to pull an adjacent small portion CDEF of the cornea is expressed by $(F_1 - F_3)$. Thus, the frictional force occurring in the surface of contact acts to arrest the transmission of tension in the cornea from its one portion to another.

In the center of the surface of contact, no frictional force occurs and the adjacent central small portion of the cornea is itself not strained to any extent. Therefore, no tension derivable from such straining takes place. As shown in FIG. 8, however, the absolute values of $T\phi$ and $T\theta$, having opposite signs, increase with the distance from the central point. $T\tau$ is supposed to have a value intermediate. Going outside the region of complete frictional engagement, the value of $T\theta$ begins to rise. In any region where friction occurs the Formula 6 does not hold true and particularly in the region of complete frictional engagement no transmission of tension takes place. Under this condition, the formula $$P_i = P_P \quad (7)$$

is obtained from the balanced relation between the forces acting on the minute rectangular section of the surface of the cornea.

Thus, with the present ophthalmotonometer, $P_i$ is determined assuming that $P_i = P_P$, and $P_i - P_P$ represents the error of measurement (see FIG. 8). Apparently no such error is involved in the region of complete frictional engagement. Let ΔS be the area of the projection of the minute rectangular section of the contact surface on a plane extending at right angles to the direction of pressure against the concave face or the direction of θ=0. The load W on the plunger, the bottom face of which forms part of the depressing concave face, is expressed as follows:

$$W = \Sigma P_p \Delta S \qquad (8)$$

Also, as long as the bottom face of the plunger rod lies within the region of complete frictional engagement, $W=P_iS$ where S represents the cross-sectional area of the rod, and the intraocular pressure $P_i$ can be obtained by the formula $$P_i = W/S \qquad (9)$$

as explained hereinbefore.

Experiment conducted with eyes of rabbits

Anterior-chamber pressure values obtained by use of the present tonometer were compared with and found to be substantially equal to those obtained according to the anterior-chamber manometry by penetrating an injection needle through the cornea of the rabbit eyes anesthetized in advance with urethane. Next, for various intraocular pressures indicated on the manometer, the plunger load of the present tonometer were recorded varying the diameter of the contacting area between the cornea and the foot plate from approximately 4 to 6 and 9 millimeters. The recorded values of the plunger load were substantially equal to one another for any particular intraocular pressure despite of the variation in diameter of the contacting areas.

Experiments conducted with human eyes

Seventy-five human eyes anesthetized with drops of lotion were examined with the present tonometer. To determine the intraocular pressure, measurement was made four times for each eye at intervals of several seconds, with the diameter of the area of contact between the cornea and the foot plate measuring approximately 4 mm. for the first and second measurements, approximately 6 mm. for the third measurement, and again approximately 4 mm. for the final measurement. The average for all the seventy-five eyes measured was 19.3 mm. Hg for the first and the second 4 mm. diameter, 19.3 mm. Hg for the 6 mm. diameter, and 18.4 mm. Hg for the final 4 mm. diameter. The difference between the average values obtained with the first and the second 4 mm. diameter and the final 4 mm. diameter is presumably due to the flow of aqueous humor out of the anterior chamber during the measurement with the 6 mm. diameter. Therefore, the difference between the values for the 6 mm. and final 4 mm. diameters, which amounts to 0.9 mm. Hg, represents the difference between the intraocular pressure during measurement with the 6 mm. diameter and that with the 4 mm. diameter.

As apparent from the above description, the most important point in the use of the present tonometer is whether in the central region surrounding the bottom of the plunger rod the friction occurring between the foot plate and the cornea contacting therewith is effective to preclude transmission of tension through the cornea or not. In this connection, the experiments conducted on the eyes of rabbits with the tonometer according to the present invention have revealed that the plunger load remains unchanged even when the diameter of the area of contact between the cornea and the foot plate is changed as long as the pressure in the anterior chamber is maintained or the same value by the aid of a manometer. If the cornea be tensioned in the vicinity of the bottom end of the plunger, the load on the latter per unit cross-sectional area of it would increase rapidly with the area of contact as long as no friction occurs therein. Also, in case the tension in the cornea is resisted but not completely cancelled by friction occurring in the area of contact, it is obvious that the plunger load again increases with the area of contact.

Therefore, in cases, where measurement is made on the eyes of rabbits with the present tonometer, obviously no substantial tension affecting the plunger load occurs in the cornea adjoining the bottom face of the plunger rod. With human eyes, the value measured with the diameter of the area of contact of approximately 4 mm. was smaller than that measured with the diameter of approximately 6 mm. by an average of 0.9 mm. Hg with no outflow of the aqueous humor from the anterior chamber. Taking into account the decrease in intraocular volume during measurement, the actual value of intraocular pressure must be higher when the area of contact has a diameter of 6 mm. than when it has a diameter of 4 mm., and the above difference of 0.9 mm. Hg between the measured values can safely be regarded as representing the difference between the actual intraocular pressures. It will be understood, therefore, that during measurement of human eyes with the present tonometer practically no tension takes place in the cornea in the vicinity of the bottom face of the plunger and the intraocular pressure can be calculated by the Formula 9 with satisfactory accuracy.

Furthermore, in actual operation of the tonometer, since there is no need of moving the pressure-receiving unit vertically with any considerable speed, no error due to the acceleration component is involved. Also, the substantial length of the rod 2 serves to prevent the pressure-receiving unit from being tilted inadvertently to cause an error in measurements of the plunger load.

The capabilities and performances of the present tonometer will next be explained. First, as with the case of applanation tonometers, any error due to stickiness of the cornea may safely be left out of consideration. Concerning the error due to its elasticity, it will be seen that the bottom faces of the foot plate 6 and rod 5 have a radius of curvature very close to that of the surface A of the cornea as the latter with Japanese people is said to lie between 6.7 and 7.9 millimeters. Accordingly, not only the elasticity of that portion of the cornea lying in contact with the bottom face of the plunger but also that of the neighboring portion of the cornea lying in contact with the edge of the plunger bottom does not form any source of error.

Next, the change in volume of the eyeball caused by, application of the tonometer will be larger with eyes the cornea of which has its surface curved with a smaller radius. Calculation made with the cornea having the minimum radius of curvature of 6.7 mm. reveals that the change in volume of the eyeball caused by application of the tonometer is less than 0.41 cubic millimeter, which is smaller than the change in volume of the eyeball occurring when the Goldman applanation tonometer is used. In other words, when the intraocular pressure of any Japanese is measured with the illustrated embodiment of the present invention, the change in volume of the eyeball caused by its application is so small as not to cause any practical problem. With Westerners, who are said to have corneas of larger radii of curvature, variation in intraocular pressure due to such change in volume of the eyeball should be correspondingly smaller.

The principles of the present invention are also applicable with success to tonometers which are used to take the intraocular blood pressure by applying an external force to the eyeball to raise its intraocular pressure and observing the pulsation or constriction of the intraocular blood vessels caused by the rise of the intraocular pressure. In this case, the bottom end of the pressure-receiving unit is applied to the surface of the conjunctiva for measurement of the pressure in the vitreous body through the intermediary of the sclera. To serve this purpose, the radius of curvature of the plunger bottom and the foot plate should be made slightly larger than that of the surface of the conjunctiva, for example, to reach 15 mm.

Though one preferred embodiment of the present invention has been shown and described herein, it will be apparent to those skilled in the art that various changes and modifications may be made therein without departing from the spirit of the invention or from the scope of the appended claim. For example, the force from the cornea acting to raise the plunger rod 5 may be transformed into an electrical quantity by piezoelectric, inductive or other appropriate means instead of utilizing changes in electric resistance as in the illustrated embodiment.

What is claimed is:
1. An ophthalmologic tonometer which comprises
   an elongated housing,
   rod means connected to the housing and extending vertically thereof at least the length of the housing to hold it in a vertical position and to facilitate controllable manual movement thereof in a substantially vertical direction,
   an optically clear foot plate of substantially the diameter of the human cornea having a central aperture mounted in fixed relation to the bottom end of the housing, and having a recessed circular portion on the bottom surface around said aperture of substantially greater diameter than the aperture,
   a vertically directed plunger rod slidably received through the aperture axially aligned with and extending in slidable relation inside the housing, one end of the plunger rod being optically clear and of substantially the curvature of a human eye at the cornea, said rod normally extending 5 microns below the bottom surface of the foot plate.
   a strain gauge carried inside the housing and actuated by the other end of the plunger rod, and
   means to detect movement of the plunger rod as an electrical voltage from the strain gauge.

References Cited

UNITED STATES PATENTS

| | | | |
|---|---|---|---|
| 2,656,715 | 10/1953 | Tolman | 73—80 |
| 2,836,173 | 5/1958 | Uemura et al. | 73—80 |
| 3,049,001 | 8/1962 | Mackay et al. | 73—80 |
| 3,150,521 | 9/1964 | Mackay et al. | 73—80 |
| 3,338,089 | 8/1967 | Coombs et al. | 73—80 |

RICHARD C. QUEISSER, Primary Examiner

C. E. SNEE III, Assistant Examiner